United States Patent
Dao et al.

(10) Patent No.: US 12,166,888 B1
(45) Date of Patent: Dec. 10, 2024

(54) SYSTEMS AND METHODS FOR ENCRYPTING DATA

(71) Applicant: Citibank, N.A., New York, NY (US)

(72) Inventors: Tuan Quoc Dao, Irving, TX (US); Mayank Dinesh Shah, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/661,549

(22) Filed: May 10, 2024

Related U.S. Application Data

(63) Continuation-in-part of application No. 18/515,835, filed on Nov. 21, 2023.

(51) Int. Cl.
  *H04L 9/32* (2006.01)
(52) U.S. Cl.
  CPC .................. *H04L 9/3213* (2013.01)
(58) Field of Classification Search
  CPC ...................................... H04L 9/3213
  See application file for complete search history.

(56) References Cited

U.S. PATENT DOCUMENTS

| | | | | |
|---|---|---|---|---|
| 2004/0167826 | A1* | 8/2004 | Kobayashi | G06Q 30/0641 705/26.61 |
| 2020/0311675 | A1* | 10/2020 | Sankaran | G06Q 10/08345 |
| 2022/0198036 | A1* | 6/2022 | Bayat | G06Q 20/385 |

* cited by examiner

*Primary Examiner* — Henry Tsang
(74) *Attorney, Agent, or Firm* — Perkins Coie LLP

(57) ABSTRACT

Systems and methods for encrypting data are described herein. For example, the system may receive, from an application associated with a provider system, a request for a delivery token. The request may include an address and an identifier of a distribution system. The system may determine a distributor key for decrypting delivery tokens for the distribution system. The system may also identify an encryption key for encrypts delivery tokens, where the encryption key corresponds to the distributor key. The system may generate the delivery token, including the address, using the encryption key. The system may then transmit the delivery token to the application associated with the provider system.

20 Claims, 3 Drawing Sheets

SYSTEMS AND METHODS FOR ENCRYPTING DATA

CROSS-REFERENCE TO RELATED APPLICATIONS

This application is a continuation-in-part of U.S. patent application Ser. No. 18/515,835 filed Nov. 21, 2023. The content of the foregoing application is incorporated herein in its entirety by reference.

SUMMARY

Currently there is a need to securely store information and provide that information on a need-to-know basis. In a delivery context, it is prudent to disclose the delivery address to only the parties that need that address. For example, a distribution system may receive requests to transport various items to various locations. In some embodiments, an item may require delivery to a user. Users may be hesitant to allow certain providers to access a delivery address or other sensitive information. For example, a provider may be new to the user, or the provider may be located in a geographic region that the user does not trust. In some embodiments, a user may not want any provider to have access to the user address. In some embodiments, a user may not want a provider to have access to other personal data, such as a phone number or a full name. Conventional systems are not adept at enabling item transport without allowing the provider to access sensitive data, such as an address.

Systems and methods are provided herein for encrypting delivery data to prevent providers from obtaining sensitive data. A data encryption system may be built and configured to perform the operations discussed herein. In some embodiments, the data encryption system may receive a request for a delivery token. For example, the data encryption system may receive the request from an application associated with a merchant. The request may include sensitive information (e.g., an address) and may identify a distribution system (e.g., a transportation service). A delivery token may encrypt the sensitive information from any entity without a proper decoding key. The data encryption system may determine a distributor key that decodes delivery tokens for the distribution system. The data encryption system may generate the delivery token using an encryption key corresponding to the distributor key such that the delivery token includes the address. The data encryption system may then transmit the delivery token to the distribution system. The distribution system may decrypt the encrypted data to determine the delivery address while the provider system, lacking the distributor key, will be unable to access the sensitive data.

In particular, the data encryption system may receive, from an application associated with a provider, a request for a delivery token. For example, the application may facilitate transactions between user devices and provider systems (e.g., online merchants). The request may include sensitive information (e.g., an address) and an identifier of a distribution system (e.g., a transportation service). In some embodiments, the application may request a single-use delivery token that expires after a single use for greater security. The delivery token may enable the distribution system to access the address to facilitate delivery of an item while preventing the provider system from accessing the address.

The data encryption system may determine the distribution system based on the identifier included in the request. In some embodiments, the data encryption system may determine, based on the identifier, a distributor key that decrypts delivery tokens for the distribution system. For example, the distributor key may include an algorithm that decrypts certain encrypted data. In some embodiments, each distribution system may have a unique distributor key than enables the distribution system to decrypt encrypted data generated for that distribution system. In some embodiments, each distributor key may fail to decrypt encrypted data that is generated for a different distribution system.

The data encryption system may identify an encryption key corresponding to the distributor key. For example, each encryption key may encrypt delivery tokens for a corresponding distribution system, and the data encryption system may identify the specific encryption key that encrypts delivery tokens for the distribution system identified in the request. The data encryption system may then generate the delivery token using the encryption key. The delivery token may thus include sensitive data (e.g., the address) that has been encrypted in such a way that only the corresponding distribution system may decrypt. The data encryption system may then transmit the delivery token to the distribution system.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/of" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which.

The figures herein are for illustrative purposes only and are not necessarily drawn to scale. These and other aspects, objects, features, and advantages of the example embodiments will become apparent to those having ordinary skill in the art upon consideration of the following detailed description of example embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement.

In some embodiments, the data encryption system (e.g., a third-party data system) may receive a request for a delivery token. For example, the third-party data system may receive the request from an application associated with a merchant. The request may include sensitive information (e.g., an address) and may identify a distribution system (e.g., a transportation service). A delivery token may encrypt the sensitive information from any entity without a proper decoding key. The third-party data system may determine a distributor key that decodes delivery tokens for the distribution system. The third-party data system may generate the delivery token using an encryption key corresponding to the distributor key such that the delivery token includes the address. The third-party data system may then transmit the delivery token to the distribution system. The distribution system may decrypt the encrypted data to determine the delivery address while the provider system, lacking the distributor key, will be unable to access the sensitive data.

Figure 1:
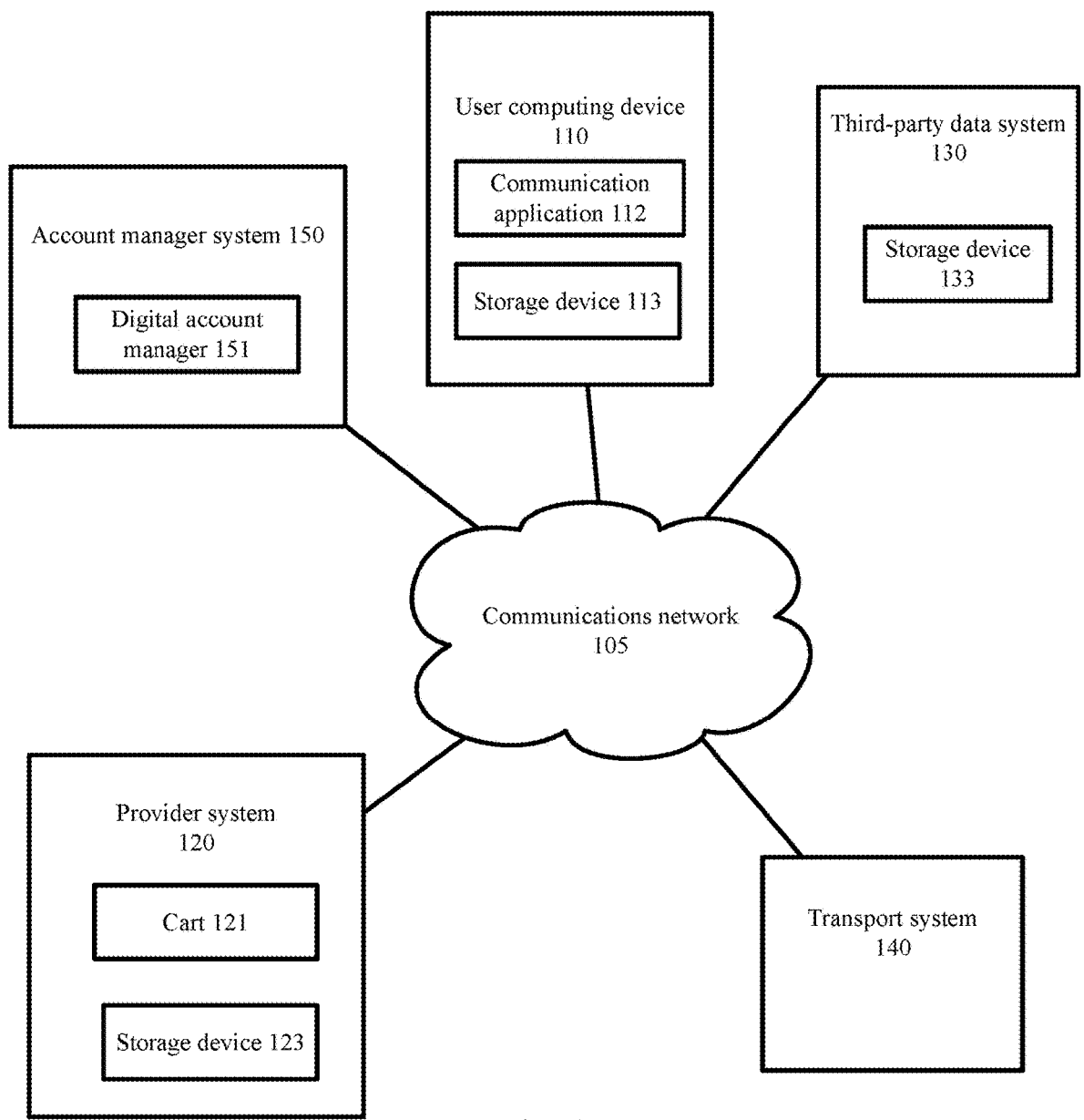
FIG. 1 is a block diagram depicting a portion of a communications and processing architecture of a typical system to provide obscured data sets.

In some embodiments, the third-party data system (e.g., third-party data system 130, as shown in FIG. 1) may receive a request for a delivery token. The third-party data system may perform the functions described herein to encrypt the delivery token. The third-party data system may be a stand-alone system, a function of a payment processing system, a function of a transporting system, a function of an online service provider, or any other type of system. The third-party data system may obscure address and tracking data as described herein to protect user data from provider systems or any other observers.

In some embodiments, the third-party data system may receive a request from a provider system (e.g., provider system 120, as shown in FIG. 1) or an application associated with a provider system. For example, the provider system may represent any suitable service provider, online store, provider, product provider, counterparty, or any other entity that desires to transport a product to a user. In an example, the provider system may be an online retailer that receives orders from a user and uses a distribution system to deliver goods to an address of the user. The provider system may be any other type of system that provides goods for delivery, such as a distribution center of a government or a hospital. The provider system may be associated with an application, module, or other function of the provider system that communicates with a user device to receive payment or transport data and conduct interactions or interactions. For example, the application may facilitate transactions between user devices and the provider systems.

The token may include data strings that have undergone encryption processes to protect sensitive information during transmission or storage. The token may be encrypted such that it may only be deciphered with the appropriate decryption key. In some embodiments, the application associated with the provider system may request a single-use token. For example, a single-use token may expire after a single use. Single-use tokens may be temporary authentication codes or identifiers used in security protocols to enhance protection against unauthorized access or fraudulent activities. Once utilized, they become invalid, mitigating the risk of unauthorized access even if intercepted. Single-use tokens may add an extra layer of security to digital interactions to safeguard sensitive data.

The request from the application associated with the provider system may include sensitive information, such as an address. For example, the application may receive the sensitive information from a user device (e.g., in connection with a transaction between the user device and the provider system). The application may request the token including the address in order to obscure the sensitive data from the provider system. In some embodiments, the request may include an identifier of a distribution system (e.g., transport system 140, as shown in FIG. 1). The distribution system may be any system that is employed or directed to transport products to a delivery address. For example, the distribution system may be a national transporting company, a governmental transporting agency, a delivery function of a provider, or any other type of transporting service. The request may identify a specific distribution system for transporting products in connection with a transaction.

The third-party data system may identify the distribution system based on the identifier included in the request. For example, the third-party data system may retrieve a listing of the plurality of distribution systems. Each distribution system within the listing may include a corresponding identifier. The third-party data system may compare the identifier received with the request to the identifiers included in the listing. The third-party data system may determine whether the identifier received with the request matches any identifiers included in the listing. For example, the identifiers may include alphanumeric strings, biometric data, or any unique attributes associated with distribution systems. In some cases, the third-party data system may identify exact matches to ensure precision. In some embodiments, the third-party data system may search for matching identifiers in part, for example, by using wildcard characters or fuzzy matching algorithms. Matching in part may accommodate variations or partial information. The third-party data system may identify a match between the identifier received with the request and a corresponding identifier of the distribution system in the listing. Based on the match, the third-party data system may identify the distribution system of the plurality of distribution systems within the listing.

In some embodiments, the third-party data system may identify a distributor key, of a plurality of distributor keys, that decrypts delivery tokens for the distribution system. For example, the distributor key may include an algorithm that decrypts certain encrypted data. In some embodiments, each distribution system may have a unique distributor key than enables the distribution system to decrypt corresponding encrypted data that was generated for that distribution system. In some embodiments, each distributor key may fail to decrypt encrypted data that is generated for a different distribution system.

In some embodiments, identifying the distributor key may involve requesting the distributor key from the distribution system. For example, the third-party data system may send a request to the distribution system and may receive the distributor key from the distribution system. In some embodiments, the third-party data system may authenticate the distributor key received from the distribution system. For example, the third-party data system may perform a lookup within a database for the distributor key based on the identifier. The third-party data system may determine that the distributor key received from the distribution system matches the distributor key in the database, using any of the matching techniques discussed above. Based on determining that the distributor key received from the distribution system matches the distributor key in the database, the third-party data system may authorize the distributor key.

The third-party data system may identify an encryption key of a plurality of encryption keys. For example, each encryption key may encrypt delivery tokens for a corresponding distribution system, and the data encryption system may identify the specific encryption key that encrypts delivery tokens for the distribution system identified in the request. The data encryption system may then generate the delivery token using the encryption key. The delivery token may thus include sensitive data (e.g., an address) that has been encrypted in such a way that only the corresponding distribution system may decrypt.

In some embodiments, identifying the encryption key may involve performing a lookup within a database for an encryption key corresponding to the distributor key. In some embodiments, the third-party data system may perform the lookup using the identifier of the distribution system. For example, the third-party data system may identify the encryption key corresponding to the distributor key using the identifier of the distribution system.

The third-party data system may generate, using the encryption key, the delivery token. In some embodiments, the delivery token may be a single-use token. The delivery token may include the sensitive information, such as the address. Generating the token may involve generating a data structure including one or more fields and modifying a first field to include the address. The third-party data system may then use the encryption key to encrypt the data. In some embodiments, the encryption key may include an encryption function. In some embodiments, the third-party data system may retrieve the encryption function by performing a lookup, within a database, for the encryption function. The third-party data system may input, into the encryption function, the encryption key and the modified data structure. The third-party data system may then receive, from the encryption function, the encrypted delivery token. In some embodiments, the third-party data system may implement an expiration mechanism to limit the token's validity period to a single use.

The third-party data system may transmit the delivery token to the application associated with the provider system. The application may subsequently share the token with the provider system, the distribution system, or other entities. The provider system, lacking the distributor key needed to decrypt the token, will be unable to access the sensitive information stored in the token, whereas the distribution system will be able to decrypt the token to access the address.

In some embodiments, the third-party data system may further encrypt tokens for transporting tracking information. For example, the third-party data system may receive, from the distribution system, tracking data corresponding to the request. The third-party data system may determine, for a user associated with the request, a user key of a plurality of user keys. The user may be associated with a user device from which the request originated. In some embodiments, the user key may be a unique decryption key associated with the user or the user device. The plurality of user keys may decrypt tracking tokens for a plurality of users. In some embodiments, the third-party data system may identify the user key by requesting the user key from the user device or performing a lookup in a database. The third-party data system may then identify a new encryption key of the plurality of encryption keys. For example, the new encryption key may correspond to the user key. In some embodiments, the third-party data system may identify the new encryption key by performing a lookup within a database for an encryption key corresponding to the user key.

The third-party data system may then generate, using the new encryption key, a tracking token that includes the tracking data. In some embodiments, generating the tracking token may involve generating a data structure including one or more fields and modifying a field to include the tracking information. The third-party data system may then use the new encryption key to encrypt the data. In some embodiments, the new encryption key may include a new encryption function. In some embodiments, the third-party data system may retrieve the new encryption function by performing a lookup, within a database, for the new encryption function. The third-party data system may input, into the new encryption function, the new encryption key and the modified data structure. The third-party data system may then receive, from the new encryption function, the encrypted tracking token. In some embodiments, the third-party data system may implement an expiration mechanism to limit the token's validity period to a single use. The third-party data system may then transmit, to the application associated with the provider system, the tracking token. The application may subsequently share the token with the provider system, the user device, or other entities. The provider system, lacking the user key needed to decrypt the token, will be unable to access the sensitive information stored in the token, whereas the user will be able to decrypt the token to access the tracking information.

In some embodiments, the third-party data system may reject or approve requests to generate the tokens. For example, certain requests may be associated with fraud, such as attempts to divert a delivery to an illegitimate actor or illegitimate address. Multiple requests to transport to a single address may also be indicative of fraud. In some embodiments, the third-party data system may use a machine learning model trained to predict validity of requests. For example, the machine learning model may be any type of model discussed in greater detail below. The third-party data system may input, into a machine learning model, a plurality of requests from the application. For example, the plurality of requests may include the request discussed above or a new request. This may cause the machine learning model to predict whether each request is valid.

For example, the third-party data system may receive, from the machine learning model, a prediction indicating that the new request is invalid. In some embodiments, the machine learning model may be trained to predict the validity of the requests based on addresses associated with the requests, the prediction may be based on a determination that a new address associated with the new request is located within a predetermined area. The predetermined area may be an area associated with fraud, may include an address previously flagged as fraudulent, or may otherwise be predetermined as invalid. In some embodiments, the machine learning model may be trained to predict the validity of the requests based on patterns within the plurality of requests, and the prediction may be based on a determination that a new address associated with the new request matches addresses associated with other requests of the plurality of requests. For example, the machine learning model may determine that the new request is invalid because multiple other requests have requested transport to the same address as the new request. In some embodiments, the machine learning model may predict that the new request is invalid based on other determinations. In response to receiving the prediction indicating that the request is invalid, the third-party data system may reject the new request.

Additional Embodiments

In the technology, a system is provided that allows an obscured data set to be generated and provided to a provider system with certain data in the data set obscured to prevent the provider from obtaining sensitive data. The obscured data may include the actual delivery address, a phone number, a user identification, or other sensitive data.

In some embodiments, a user that is conducting interactions using a digital account manager or other type of online instrument establishes an account with a third-party data system. The third-party data system receives the delivery address or other sensitive data of the user and creates a data set that obscures sensitive data. The obscured data set is generated by the third-party data system and provided to the digital account manager or any payment application that has a Know-Your-Customer ("KYC") relationship with the user.

When a user requests a delivery from a provider system, the provider system requests a delivery address from the user or from the digital account manager. Instead of provided the actual delivery address, the digital account manager provides the obscured data set. When the provider initiates a transport, such as when a purchased product is ready for transportation to the user, the provider system provides the order information and the obscured data set to the third-party data system. The third-party data system unmasks the obscured data set and associates the transportation of the product with the actual delivery address. The third-party data system provides the actual delivery address to a transport system with the order data. With the actual delivery address, the transport system may deliver the product to the delivery address. In another example, the provider system provides the obscured data set to the transport system for delivery. The transport system may request unmasking of the obscured data set from the third-party data system.

The third-party data system may request tracking data from the transport system. The third-party data system data obscures the tracking data to obscure the sensitive data and provides the tracking data set to the provider system. The tracking data set allows the provider system to see a status of the delivery without seeing the delivery address, the username, or other sensitive data.

The third-party data system will optionally apply a set of risk rules before generating or providing an obscured data set. The risk rules may be a static set of rules or a continuously updated set of rules. The risk rules may be created or implemented by a machine learning algorithm or system operating on the third-party data system. The risk rules may detect illegitimate delivery data, such as an attempt to divert a delivery to an illegitimate actor. In another example, the risk rules may detect that an abnormal number of deliveries are being transported to a single address in a location that is associated with fraud.

This invention represents an advance in computer engineering and a substantial advancement over existing practices. Certain examples herein are related to delivery of orders from financial interactions, but any other type of deliveries may use the processes, systems, and methods described herein. For example, a peer-to-peer delivery may use the process if the recipient does not want the sender to have the user's address. In another example, a distributed warehouse organization may distribute product to multiple locations. The technology is directed to the process of generating and providing obscured data sets and not to the interaction itself. The technology is not an economic technology, but instead is a delivery service technology that provides an improvement to current delivery systems. The technology provides data transfers using data obscuring to prevent theft or unauthorized use of private data.

Example System Architectures

Turning now to the drawings, in which like numerals represent like (but not necessarily identical) elements throughout the figures, example embodiments are described in detail.

FIG. 1 is a block diagram depicting a system 100 to provide obscured data sets. A user associated with a user computing device 110 installs an application or makes a feature selection to obtain the benefits of the techniques described herein.

As depicted in FIG. 1, the system 100 includes network computing devices/systems 110, 120, 130, 140, and 150 that are configured to communicate with one another via one or more networks 105 or via any suitable communication technology.

Each network 105 includes a wired or wireless telecommunication means by which network devices/systems (including devices 110, 120, 130, 140, and 150) can exchange data, such as a fiber optic cable network. For example, each network 105 can include any of those described herein such as the network 2080 described in FIG. 3 or any combination thereof or any other appropriate architecture or system that facilitates the communication of signals and data. Throughout the discussion of example embodiments, the terms "data" and "information" are used interchangeably herein to refer to text, images, audio, video, or any other form of information that can exist in a computer-based environment. The communication technology utilized by the devices/systems 110, 120, 130, 140, and 150 may be similar networks to network 105 or an alternative communication technology.

Each network computing device/system 120, 130, 140, and 150 includes a computing device having a communication module capable of transmitting and receiving data over the network 105 or a similar network. For example, each network device/system 120, 130, 140, and 150 can include any computing machine 2000 described herein and found in FIG. 3 or any other wired or wireless, processor-driven device. In the example embodiment depicted in FIG. 1, the network devices/systems 120, 130, 140, and 150 are operated by provider operators, third-party data system operators, transport system operators, and/or account manager system operators or users, respectively.

The user computing device 110 can use the communication application 112, which may be, for example, a web browser, application, or a stand-alone module, to view, download, upload, or otherwise access documents or web pages through a user interface via the network 105. The user computing device 110 can interact with the web servers or other computing devices connected to the network 105, including the provider system 120, the third-party data system 130, or any other component of the network 105. In another example embodiment, the user computing device 110 communicates with devices in the network 105 via any other suitable technology, including the example computing system described below. In an example, the communication application 112 is an application for conducting interactions with the provider system 120.

The user computing device 110 also includes a data storage unit 113 accessible by the communication application 112, or other applications. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory. In another example embodiments, the data storage unit 113 may reside in a cloud-based computing system.

An example provider system 120 comprises a data storage unit 123 and a cart 121. The provider system 120 may represent any suitable service provider, online store, provider, product provider, counterparty, or any other entity that desires to transport a product to a user. In an example, the provider system 120 is an online retailer that receives orders from a user and uses a transport system 140 to deliver goods to an address of the user. The provider system 120 may be any other type of system that provides goods for delivery, such as a distribution center of a government or a hospital. The cart 121 may be an application, module, or other function of the provider system 120 that provides communicates with the user computing device 110 to receive payment and/or transport data and conduct interactions or interactions.

The data storage unit 123 can include any local or remote data storage structure accessible to the provider system 120 suitable for storing information. The data storage unit 123 can include one or more tangible computer-readable storage devices, or the data storage unit 123 may be a separate system, such as a different physical or virtual machine or a cloud-based storage service.

A third-party data system 130 may include a data storage unit 133. The third-party data system 130 performs the functions described herein to obscure the delivery address and provide the data set to the user computing device 110. The third-party data system 130 may be a stand-alone system, a function of a payment processing system, a function of a transporting system, a function of an online service provider, or any other type of system. The third-party data system 130 may obscure address and tracking data as described herein to protect user data from provider systems 120 or any other observers.

The data storage unit 133 can include any local or remote data storage structure accessible to the third-party data system 130 suitable for storing information. The data storage unit 133 can include one or more tangible computer-readable storage devices, or the data storage unit 133 may be a separate system, such as a different physical or virtual machine or a cloud-based storage service.

The transport system 140 may be any system that is employed or directed to transport products to a delivery address. For example, the transport system 140 may be a national transporting company, a governmental transporting agency, a delivery function of a provider, or any other type of transporting service. The transport system 140 may use any number of servers, computing devices, or communication devices to receive instructions to transport, delivery addresses, products to transport, or any other needed data. The transport system 140 may provide tracking data for any transportations by logging statuses of transported products at multiple locations in the journey to the delivery address and providing the status to a requester.

The account manager system 150 provides a mechanism for conducting interactions or other interactions with a provider system 120. The account manager system 150 may be any type of application, software, server, device, or other function that provides payment information, delivery information, or other needed data to a provider system 120. The account manager system 150 receives data and requests from the provider system 120 associated with any interaction. The account manager system 150 may host a digital account manager 151 or any suitable payment application. For example, the digital account manager 151 may store one or more payment instruments, such as credit cards, debit cards, prepaid cards, bank accounts, or any other type of payment instrument. The digital account manager 151 may present the payment instrument to the provider system 120 by communicating account information, data sets, or any other type of data to conduct the interactions.

It will be appreciated that the network connections shown are examples, and other means of establishing a communications link between the computers and devices can be used. Moreover, those having ordinary skill in the art having the benefit of the present disclosure will appreciate that the user computing device 110, provider system 120, the third-party data system 130, the transport system 140, and the account manager system 150 illustrated in FIG. 1 can have any of several other suitable computer system configurations. For example, a provider system 120 embodied as a mobile phone or handheld computer may not include all the components described above.

Figure 3:
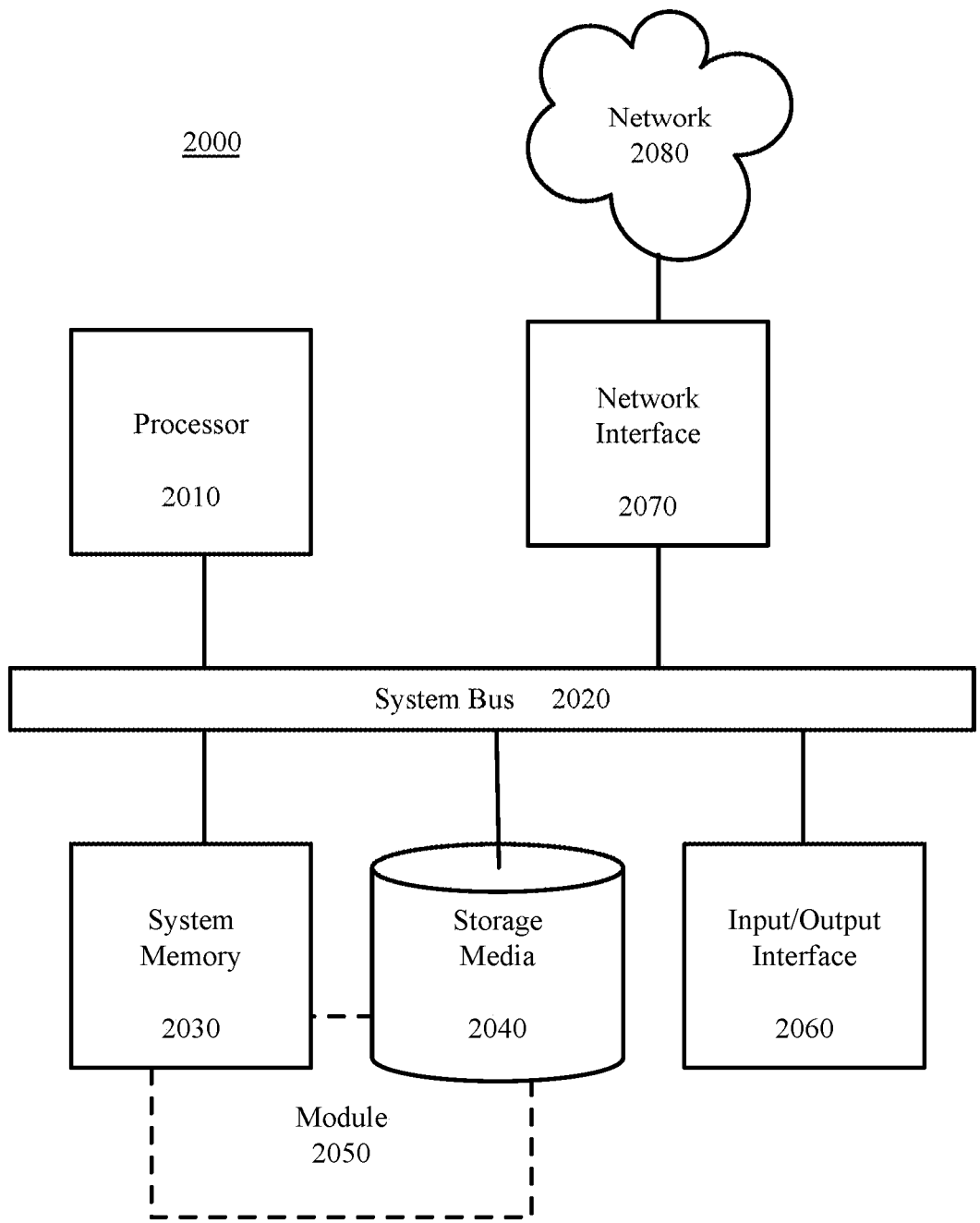
FIG. 3 is a block diagram depicting a computing machine and modules.

In example embodiments, the network computing devices and any other computing machines associated with the technology presented herein may be any type of computing machine such as, but not limited to, those discussed in more detail with respect to FIG. 3. Furthermore, any modules associated with any of these computing machines, such as modules described herein or any other modules (scripts, web content, software, firmware, or hardware) associated with the technology presented herein may by any of the modules discussed in more detail with respect to FIG. 3. The computing machines discussed herein may communicate with one another as well as other computer machines or communication systems over one or more networks, such as network 105. The network 105 may include any type of data or communications network, including any of the network technology discussed with respect to FIG. 3.

Example Processes

Figure 2:
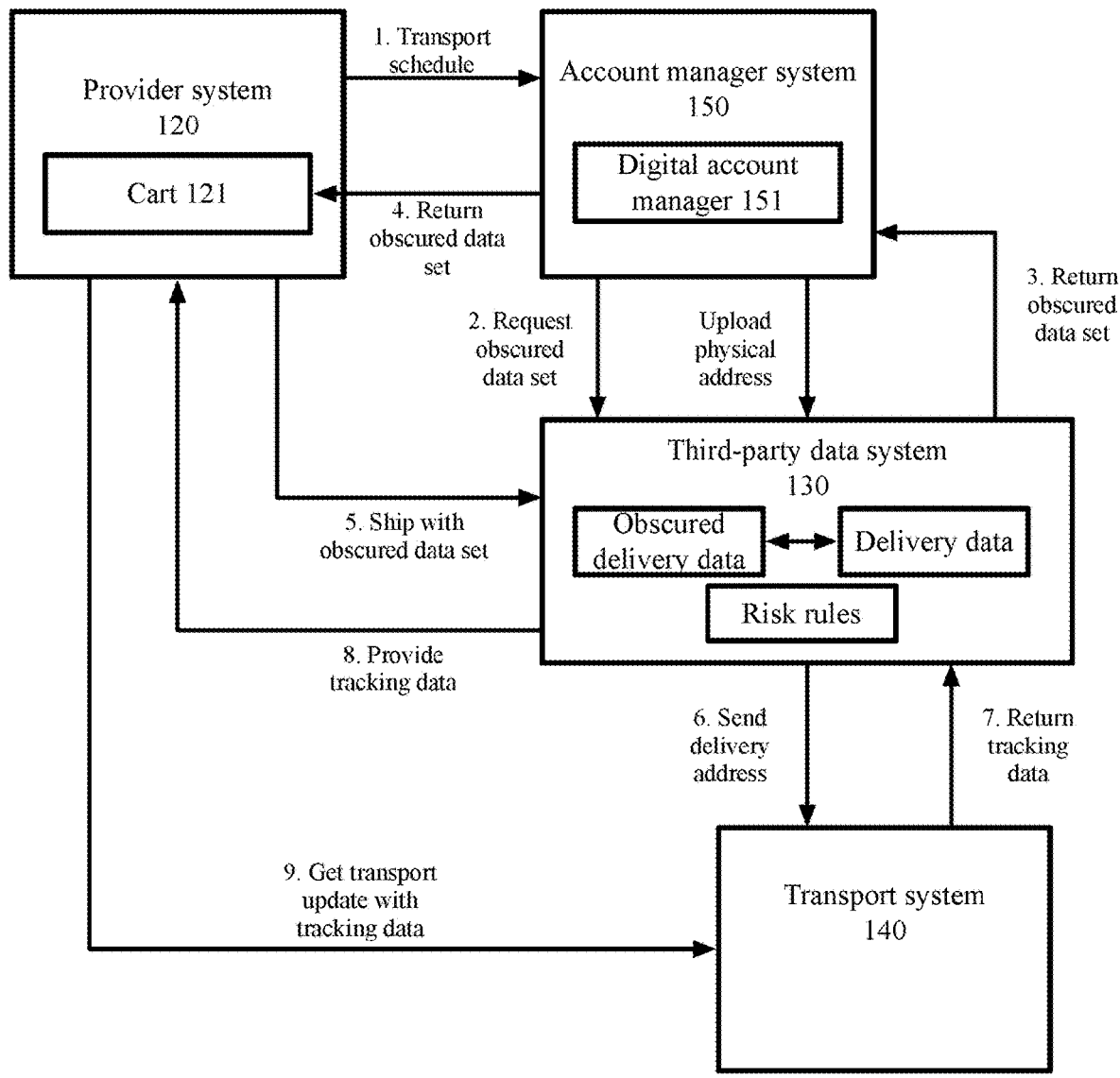
FIG. 2 is a block flow diagram depicting a method to provide obscured data sets.

The example methods illustrated in FIG. 2 are described hereinafter with respect to the components of the example architecture 100. The example methods also can be performed with other systems and in other architectures including similar elements.

Referring to FIG. 2, and continuing to refer to FIG. 1 for context, a block flow diagram depicting a method 200 to provide obscured data sets, in accordance with certain examples of the technology disclosed herein.

In step 1 of FIG. 2, the provider system 120 and the digital account manager 151 are at a transport scheduling page. A user may be accessing the digital account manager 151 on a user computing device 110 and communicating with the provider system 120 with the user computing device 110. For example, if the provider system 120 and the digital account manager 151 are functions of a distribution system, the transport scheduling page may be an application for scheduling deliveries from the provider system 120 to an address associated with the digital account manager 151. In another example, the transport scheduling page is a checkout page for an online transaction.

The transport scheduling page may be a page that summarizes the interaction, requests and receives payment information or other authorization, and requests a delivery address at which the product should be delivered. The digital account manager 151 receives the request for the delivery address and requests instructions from the user. The user may provide instructions for whether or not to provide a delivery address at the time of the request.

In the example, the user does not desire to provide the provider system 120 with the actual delivery address because the provider system 120 may be unfamiliar to the user, the provider system 120 has a history of suspicious behaviors, the provider system 120 is located in a risky geographic location, or for any reason the user determines that the provider system 120 is untrustworthy.

In step 2, the digital account manager 151 provides a request to the third-party data system 130 for an obscured data set. For a higher level of privacy protection, this data set may be created and used for a particular interaction only and will be discarded after the delivery is completed. The digital account manager 151 may provide the actual delivery address to the third-party data system 130 at the time of the delivery request or at an earlier time. For example, the digital account manager 151 may establish a delivery address with the third-party data system 130 at the time of registering an account, or at any other suitable time. If the digital account manager 151 requests a different delivery address than an established delivery address, the digital account manager 151 may provide the new delivery address at the time of the request for delivery with a request to obscure the new delivery address.

In step 3, the third-party data system 130 returns an obscured data set to the digital account manager 151. Obscuring of the delivery address or any other information replaces sensitive or private elements with a series of non-sensitive, randomly generated elements so that the link between the data set values and sensitive information cannot be reverse-engineered. For example, the address, a phone number, a name of the user, or any other suitable private data may be obscured. The obscured data may use a tokenization process to provide the data as a token or use any other type of digital encryption technology.

The obscuring of the data may use any available obscuring methods. These include tokenization with a key to create a theoretically reversible cryptographic function. Another process includes a function that cannot be reversed, such as a hash function. In another process, an index function or a number produced at random may be used. The obscured data set will become the exposed information, while the sensitive data that the obscured data represents is securely held, such as on a centralized server called the data set vault. Only in the data set vault can the original sensitive data be mapped back to its appropriate data set. These or any other type of commercially available processes may be used to obscure the data.

After the data set is created, the third-party data system 130 transmits the obscured data set to the digital account manager 151 to be used in the pending interaction or a future interaction. In examples, the obscured data set is only used for a single delivery and is deleted after use as a further security measure. In other examples, the third-party data system 130 transmits the obscured data set directly to the cart 121 or any other function of the provider system 120, if requested by the digital account manager 151.

In step 4, the digital account manager 151 communicates the obscured data set to the cart 121 or any other function of the provider system 120. In an example, the digital account manager 151 communicates the obscured data set concurrently or with payment information, such as with a credit card data set. The communication may be via a network, such as network 105, or via NFC, Bluetooth, Wi-Fi, or any other communication technology.

Upon receiving the transport data in the form of the obscured data set, the provider system 120 may complete the interaction and schedule delivery of a product. In certain examples, a financial interaction is not conducted, and the interaction may be for any other purpose that proceeds with a delivery of a product.

In step 5, the provider system 120 initiates the delivery with the obscured data set. The provider system 120 may perform any functions to provide the third-party data system 130 with the data and products for delivery. For example, the provider system 120 may communicate the obscured data set, a product for delivery, a time for pick-up from the provider system 120, a time for delivery to the user, payment for the delivery, product details, and any other suitable information. The provider system 120 may provide data to allow the transport system 140 to pick up the product to be transported to the delivery address, such as from a warehouse, a provider location, or any other location.

The provider system 120 provides the obscured data set to the third-party data system 130 along with the transport data that is not sensitive. The communication may be via any suitable technology such as via the network 105.

In another example, the provider system 120 provides the transport information directly to the transport system 140. For example, the provider system 120 may not be aware that the address is obscured or the provider system 120 may not be aware of which third-party data system 130 is capable of unmasking the obscured data set. The provider system 120 provides the obscured data set to the transport system 140 and relies on the transport system 140 to identify the delivery address. In this example, the transport system 140 recognizes that the obscured data set was obscured by the third-party data system 130. The transport system 140 provides the obscured data set to the third-party data system 130 and requests the delivery address.

In step 6, the third-party data system 130 provides the delivery address to the transport system 140. The third-party data system 130 unmasks the obscured data set, or otherwise extracts the delivery address from the obscured data set, such as via a detokenization. For example, the third-party data system 130 extracts the user account data in the unobscured data and identifies the delivery address associated with the user account. The third-party data system 130 associates the delivery address with the transport data and communicates the transport data to the transport system 140. The third-party data system 130 may communicate the delivery address, a product for delivery, a time for pick-up from the provider system 120, a time for delivery to the user, payment for the delivery, product details, and any other suitable information to the transport system 140.

In step 7, the transport system 140 communicates a tracking number or other tracking data set to the third-party data system 130. The transport system 140 prepares the product for delivery and proceeds with the delivery. For example, the transport system 140 packages the product if needed, attaches a label to the package, and transports the package towards the destination of the delivery address.

The transport system 140 may place a full delivery address label on the package. In another example, the transport system 140 places a label that only includes a representation of the obscured data set instead of any personal or sensitive delivery information. The obscured label may be unmasked or otherwise understood by only certain elements of the transport system 140. For example, an electronic scanner of the transport system 140 may be able to scan a representation of the data set to allow delivery while a human is unable to read the label.

In an example, instead of a tracking data set, a tracking number is provided. The tracking number is a conventional tracking number. In another example, the transport system 140 data obscures the tracking number and other data into an obscured tracking data set using any suitable data obscuring technology. In another example, the tracking data is obscured by the third-party data system 130. That is, the transport system 140 provides tracking data that includes the sensitive transporting data, and the third-party data system 130 data obscures the data into an obscured tracking data set for communication to the user computing device 110 or the provider system 120. The obscured tracking data set allows the tracking data to be communicated without fear of an unauthorized party reading the sensitive data of the user.

In step 8, the third-party data system 130 provides the tracking data set to the provider system 120. In an example, the provider system 120 makes a request for transporting updates to the third-party data system 130 or directly to the transport system 140. The third-party data system 130 replies with the tracking data set to identify the delivery associated with the request. In a continuing example, the provider system 120 receives a request from the digital account manager 151 for transporting updates. The provider system 120 provides a request to the third-party data system 130 for tracking data for display or communication to the digital account manager 151.

The third-party data system 130 identifies the delivery associated with the request and communicates the tracking data set to the provider system 120.

In step 9, the provider system 120 requests transport updates or tracking data from the transport system 140 using the obscured tracking data set. For example, the provider system 120 communicates a request to the transport system 140 or the third-party data system 130 that includes a request for tracking data. The request may include the obscured tracking data set. The transport system 140 receives the obscured tracking data set and unmasks the tracking data set to obtain the data related to the delivery. In another example, the transport system 140 provides the received tracking data set to the third-party data system 130 with a request an unmasking of the tracking data set.

With the data from the unmasked tracking data set, the transport system 140 identifies data associated with the delivery, such as the current location, the delivery waypoints passed and scheduled, the delivery address, and any other suitable data.

The transport system 140 provides an update to the provider system 120 of the tracking data identified. In an example, the transport system 140 does not provide any personal information, such as the actual delivery address. For example, the transport system 140 may only update the third-party data system 130 that the delivery is in the city of the delivery address without disclosing the city name. In another example, the transport system 140 may only update the third-party data system 130 that the delivery is enroute with a local delivery driver. Any level of specificity in the provided update may be configured by the user, the third-party data system 130, the transport system 140, or any other suitable party.

In one example, the third-party data system 130 may optionally apply a set of risk rules before generating or providing an obscured data set. The risk rules may be a static set of rules or a continuously updated set of rules. The risk rules may determine when a delivery address should be obscured or when a delivery should be canceled or denied. The risk rules may be created or implemented by a machine learning algorithm or system operating on the third-party data system 130. The risk rules may detect illegitimate delivery data, such as an attempt to divert a delivery to an illegitimate actor. In another example, the risk rules may detect that an abnormal number of deliveries are being transported to a single address in a location that is associated with fraud.

In an example, the creation and application of the risk rules may be performed using one or more machine learning algorithms hosted by a server or other device of the third-party data system 130. As described in the Machine Learning section below, the data stored by the third-party data system 130 is used to train the machine learning algorithm to create predictive models of the locations, addresses, actions, systems, locations, devices, or any other characteristic of the parties to the transporting interaction.

The machine learning function imports or otherwise receives the data from the third-party data system 130, the provider system 120, the user computing device 110, and the transport system 140. The data is fed into the machine learning algorithm or otherwise provided as training data to the machine learning algorithm. As described herein, the data is processed and categorized by the machine learning algorithm. For example, addresses, deliveries, error logs, fraud logs, and outcomes of previous deliveries, are used as input data. The machine learning algorithm may extract non-trivial characteristics linking the data. For example, the input data to a neural network eventually becomes weights used by equations in nodes (e.g. one or more hidden layers transforms the input data into values to which the weights are applied and adjusted according to an output value). Therefore, the neural network "learns" indescribable patterns between inputs. These unseen connections, trends, and tendencies may not alone be indicative of an imminent failure, but a pattern that is not realistically observable by human analysis may provide a basis for a need for obscuring the data, initiating an investigation, altering the transporting process, or refusing to transport a product.

In an example, the machine learning algorithm determines relationships between a location of a transporting address, a type of product to be transported, and a requested delivery method. If an unseen connection between the three inputs suggests that a certain combination is indicative of a higher-than-normal fraud rate, then actions may be taken to reduce the risk. For example, a secondary verification of the delivery may be requested, a denial of the delivery, or a request to hold the delivery for further investigation may be recommended by the machine learning algorithm.

As described herein, different machine learning algorithms may be tested to determine which type of machine learning algorithm provides the most accurate predictions or results. For example, the results may be tested by comparing predicted results of applying different rule sets to historical data in which fraud was identified. The machine learning algorithm may deploy the model or algorithm selected for usage in real time based on the results of the testing. The results of the usage may be fed back to the machine learning algorithm to allow for adjustments to the selected algorithm. As additional results are received from user interactions, the model may be adjusted to better fit the data and thus make more accurate predictions.

The details of the method to train the machine learning algorithm are described in greater detail in the Machine Learning section below. In the examples herein, different machine learning algorithms utilized may include, but are not limited to, support vector machines, naive Bayes, neural networks, gradient boosting machines, random forests, and an ensemble of multiple algorithms. These algorithms are discussed in greater detail below.

Machine Learning

Machine learning is a field of study within artificial intelligence that allows computers to learn functional relationships between inputs and outputs without being explicitly programmed.

The term "Artificial Intelligence" refers to a quantitative method, system, or approach ("techniques") that emulates human intelligence via computer programs. These can be used to make estimates, predictions, recommendations, or decisions in manners that go beyond classical, statistical, mathematical, econometric, or financial approaches.

Machine learning is the subset of AI that derives representations or inferences from data without explicitly programming every parameter representation or computer step (for example, Random Forest or Artificial Neural Network based algorithm approaches). In contrast, AI techniques that are not members of the machine learning subset include techniques such as fuzzy logic, complex dependency parsing techniques for natural language processing.

Machine learning involves a module comprising algorithms that may learn from existing data by analyzing, categorizing, or identifying the data. Such machine-learning algorithms operate by first constructing a model from training data to make predictions or decisions expressed as outputs. In example embodiments, the training data includes data for one or more identified features and one or more outcomes, for example using user transporting histories to identify that a failure is likely. Although example embodiments are presented with respect to a few machine-learning algorithms, the principles presented herein may be applied to other machine-learning algorithms.

Data supplied to a machine learning algorithm can be considered a feature, which can be described as an individual measurable property of a phenomenon being observed. The concept of feature is related to that of an independent variable used in statistical techniques such as those used in linear regression. The performance of a machine learning algorithm in pattern recognition, classification and regression is highly dependent on choosing informative, discriminating, and independent features. Features may comprise numerical data, categorical data, time-series data, strings, graphs, or images.

In general, there are two categories of machine learning problems: classification problems and regression problems. Classification problems, also referred to as categorization problems, aim at classifying items into discrete category values. Training data teaches the classifying algorithm how to classify. In example embodiments, features to be categorized may include interaction data, which can be provided to the classifying machine learning algorithm and then placed into categories of, for example, interactions with provider X, requesting data type Y, from user computing device Z, at geolocation A, or using application B. Regression algorithms aim at quantifying and correlating one or more features. Training data teaches the regression algorithm how to correlate the one or more features into a quantifiable value.

Embedding

In one example, the machine learning module may use embedding to provide a lower dimensional representation, such as a vector, of features to organize them based off respective similarities. In some situations, these vectors can become massive. In the case of massive vectors, particular values may become very sparse among a large number of values (e.g., a single instance of a value among 50,000 values). Because such vectors are difficult to work with, reducing the size of the vectors, in some instances, is necessary. A machine learning module can learn the embeddings along with the model parameters. In example embodiments, features such as geolocation can be mapped to vectors implemented in embedding methods. In example embodiments, embedded semantic meanings are utilized. Embedded semantic meanings are values of respective similarity. For example, the distance between two vectors, in vector space, may imply two values located elsewhere with the same distance are categorically similar. Embedded semantic meanings can be used with similarity analysis to rapidly return similar values. In example embodiments, the methods herein are developed to identify meaningful portions of the vector and extract semantic meanings between that space.

Training Methods

In example embodiments, the machine learning module can be trained using techniques such as unsupervised, supervised, semi-supervised, reinforcement learning, transfer learning, incremental learning, curriculum learning techniques, and/or learning to learn. Training typically occurs after selection and development of a machine learning module and before the machine learning module is operably in use. In one aspect, the training data used to teach the machine learning module can comprise input data such as user transporting histories.

Unsupervised and Supervised Learning

In an example embodiment, unsupervised learning is implemented. Unsupervised learning can involve providing all or a portion of unlabeled training data to a machine learning module. The machine learning module can then determine one or more outputs implicitly based on the provided unlabeled training data. In an example embodiment, supervised learning is implemented.

Supervised learning can involve providing all or a portion of labeled training data to a machine learning module, with the machine learning module determining one or more outputs based on the provided labeled training data, and the outputs are either accepted or corrected depending on the agreement to the actual outcome of the training data. In some examples, supervised learning of machine learning system(s) can be governed by a set of rules and/or a set of labels for the training input, and the set of rules and/or set of labels may be used to correct inferences of a machine learning module.

Semi-Supervised and Reinforcement Learning

In one example embodiment, semi-supervised learning is implemented. Semi-supervised learning can involve providing all or a portion of training data that is partially labeled to a machine learning module. During semi-supervised learning, supervised learning is used for a portion of labeled training data, and unsupervised learning is used for a portion of unlabeled training data. In one example embodiment, reinforcement learning is implemented. Reinforcement learning can involve first providing all or a portion of the training data to a machine learning module and as the machine learning module produces an output, the machine learning module receives a "reward" signal in response to a correct output. Typically, the reward signal is a numerical value and the machine learning module is developed to maximize the numerical value of the reward signal. In addition, reinforcement learning can adopt a value function that provides a numerical value representing an expected total of the numerical values provided by the reward signal over time.

Transfer Learning

In one example embodiment, transfer learning is implemented. Transfer learning techniques can involve providing all or a portion of a first training data to a machine learning module, then, after training on the first training data, providing all or a portion of a second training data. In example embodiments, a first machine learning module can be pre-trained on data from one or more computing devices. The first trained machine learning module is then provided to a computing device, where the computing device is intended to execute the first trained machine learning model to produce an output. Then, during the second training phase, the first trained machine learning model can be additionally trained using additional training data, where the training data can be derived from kernel and non-kernel data of one or more computing devices. This second training of the machine learning module and/or the first trained machine learning model using the training data can be performed using either supervised, unsupervised, or semi-supervised learning. In addition, it is understood transfer learning techniques can involve one, two, three, or more training attempts. Once the machine learning module has been trained on at least the training data, the training phase can be completed. The resulting trained machine learning model can be utilized as at least one of trained machine learning module.

Incremental and Curriculum Learning

In one example embodiment, incremental learning is implemented. Incremental learning techniques can involve providing a trained machine learning module with input data that is used to continuously extend the knowledge of the trained machine learning module. Another machine learning training technique is curriculum learning, which can involve training the machine learning module with training data arranged in a particular order, such as providing relatively easy training examples first, then proceeding with progressively more difficult training examples. As the name suggests, difficulty of training data is analogous to a curriculum or course of study at a school.

Learning to Learn

In one example embodiment, learning to learn is implemented. Learning to learn, or meta-learning, comprises, in general, two levels of learning: quick learning of a single task and slower learning across many tasks. For example, a machine learning module is first trained and comprises of a first set of parameters or weights. During or after operation of the first trained machine learning module, the parameters or weights are adjusted by the machine learning module. This process occurs iteratively on the success of the machine learning module. In another example, an optimizer, or another machine learning module, is used wherein the output of a first trained machine learning module is fed to an optimizer that constantly learns and returns the final results. Other techniques for training the machine learning module and/or trained machine learning module are possible as well.

Contrastive Learning

In example embodiment, contrastive learning is implemented. Contrastive learning is a self-supervised model of learning in which training data is unlabeled is considered as a form of learning in-between supervised and unsupervised learning. This method learns by contrastive loss, which separates unrelated (i.e., negative) data pairs and connects related (i.e., positive) data pairs. For example, to create positive and negative data pairs, more than one view of a datapoint, such as rotating an image or using a different time-point of a video, is used as input. Positive and negative pairs are learned by solving dictionary look-up problem. The two views are separated into query and key of a dictionary. A query has a positive match to a key and negative match to all other keys.

The machine learning module then learns by connecting queries to their keys and separating queries from their non-keys. A loss function, such as those described herein, is used to minimize the distance between positive data pairs (e.g., a query to its key) while maximizing the distance between negative data points. See e.g., Tian, Yonglong, et al. "What makes for good views for contrastive learning?" Advances in Neural Information Processing Systems 33 (2020): 6827-6839.

Pre-Trained Learning

In example embodiments, the machine learning module is pre-trained. A pre-trained machine learning model is a model that has been previously trained to solve a similar problem. The pre-trained machine learning model is generally pre-trained with similar input data to that of the new problem. A pre-trained machine learning model further trained to solve a new problem is generally referred to as transfer learning, which is described herein. In some instances, a pre-trained machine learning model is trained on a large dataset of related information. The pre-trained model is then further trained and tuned for the new problem. Using a pre-trained machine learning module provides the advantage of building a new machine learning module with input neurons/nodes that are already familiar with the input data and are more readily refined to a particular problem. See e.g., Diamant N, et al. Patient contrastive learning: A performant, expressive, and practical approach to electrocardiogram modeling. PLoS Comput Biol. 2022 Feb. 14; 18(2): e1009862.

In some examples, after the training phase has been completed but before producing predictions expressed as outputs, a trained machine learning module can be provided to a computing device where a trained machine learning module is not already resident, in other words, after training phase has been completed, the trained machine learning module can be downloaded to a computing device. For example, a first computing device storing a trained machine learning module can provide the trained machine learning module to a second computing device. Providing a trained machine learning module to the second computing device may comprise one or more of communicating a copy of trained machine learning module to the second computing device, making a copy of trained machine learning module for the second computing device, providing access to trained machine learning module to the second computing device, and/or otherwise providing the trained machine learning system to the second computing device. In example embodiments, a trained machine learning module can be used by the second computing device immediately after being provided by the first computing device. In some examples, after a trained machine learning module is provided to the second computing device, the trained machine learning module can be installed and/or otherwise prepared for use before the trained machine learning module can be used by the second computing device.

After a machine learning model has been trained it can be used to output, estimate, infer, predict, generate, produce, or determine, for simplicity these terms will collectively be referred to as results. A trained machine learning module can receive input data and operably generate results. As such, the input data can be used as an input to the trained machine learning module for providing corresponding results to kernel components and non-kernel components. For example, a trained machine learning module can generate results in response to requests. In example embodiments, a trained machine learning module can be executed by a portion of other software. For example, a trained machine learning module can be executed by a result daemon to be readily available to provide results upon request.

In example embodiments, a machine learning module and/or trained machine learning module can be executed and/or accelerated using one or more computer processors and/or on-device co-processors. Such on-device co-processors can speed up training of a machine learning module and/or generation of results. In some examples, trained machine learning module can be trained, reside, and execute to provide results on a particular computing device, and/or otherwise can make results for the particular computing device.

Input data can include data from a computing device executing a trained machine learning module and/or input data from one or more computing devices. In example embodiments, a trained machine learning module can use results as input feedback. A trained machine learning module can also rely on past results as inputs for generating new results. In example embodiments, input data can comprise user transporting histories, and, when provided to a trained machine learning module, results in output data such as that a failure is likely. The output can then be provided to a user to inspect a component or fiber cable.

Algorithms

Different machine-learning algorithms have been contemplated to carry out the embodiments discussed herein. For example, linear regression (LiR), logistic regression (LoR), Bayesian networks (for example, naive-bayes), random forest (RF) (including decision trees), neural networks (NN) (also known as artificial neural networks), matrix factorization, a hidden Markov model (HMM), support vector machines (SVM), K-means clustering (KMC), K-nearest neighbor (KNN), a suitable statistical machine learning algorithm, and/or a heuristic machine learning system for classifying or evaluating whether one or more rules would be useful to identify a likely failure.

The methods described herein can be implemented with more than one machine learning method. The machine learning system can use a combination of machine learning algorithms. The machine learning algorithms may be of the same type or of different types. For example, a first machine learning algorithm may be trained for a first type of result, while a second machine learning algorithm may be trained for a second type of result. In certain examples, the first type of result may be an input into the second machine learning algorithm, while in other examples, the two results are combined to produce a third result. In certain examples, the first and second types of results are both inputs into a third machine learning algorithm that produces the third result.

Linear Regression (LiR)

In one example embodiment, linear regression machine learning is implemented. LiR is typically used in machine learning to predict a result through the mathematical relationship between an independent and dependent variable. A simple linear regression model would have one independent variable (x) and one dependent variable (y). A representation of an example mathematical relationship of a simple linear regression model would be y=mx+b. In this example, the machine learning algorithm tries variations of the tuning variables m and b to optimize a line that includes all the given training data.

The tuning variables can be optimized, for example, with a cost function. A cost function takes advantage of the minimization problem to identify the optimal tuning variables. The minimization problem preposes the optimal tuning variable will minimize the error between the predicted outcome and the actual outcome. An example cost function may comprise summing all the square differences between the predicted and actual output values and dividing them by the total number of input values and results in the average square error.

To select new tuning variables to reduce the cost function, the machine learning module may use, for example, gradient descent methods. An example gradient descent method comprises evaluating the partial derivative of the cost function with respect to the tuning variables. The sign and magnitude of the partial derivatives indicate whether the choice of a new tuning variable value will reduce the cost function, thereby optimizing the linear regression algorithm. A new tuning variable value is selected depending on a set threshold. Depending on the machine learning module, a steep or gradual negative slope is selected. Both the cost function and gradient descent can be used with other algorithms and modules mentioned throughout. For the sake of brevity, both the cost function and gradient descent are well known in the art and are applicable to other machine learning algorithms and may not be mentioned with the same detail.

LiR models may have many levels of complexity comprising one or more independent variables. Furthermore, in an LiR function with more than one independent variable, each independent variable may have the same one or more tuning variables or each, separately, may have their own one or more tuning variables. The number of independent variables and tuning variables will be understood to one skilled in the art for the problem being solved. In example embodiments, user transporting histories are used as the independent variables to train a LiR machine learning module, which, after training, is used to estimate, for example, whether fraud is likely.

Logistic Regression (LoR)

In one example embodiment, logistic regression machine learning is implemented. Logistic Regression, often considered a LiR type model, is typically used in machine learning to classify information, such as user transporting histories into categories such as whether fraud is likely. LoR takes advantage of probability to predict an outcome from input data. However, what makes LoR different from a LiR is that LoR uses a more complex logistic function, for example a sigmoid function. In addition, the cost function can be a sigmoid function limited to a result between O and 1. For example, the sigmoid function can be of the form. $f(x)=1/(1+e-x)$, where x represents some linear representation of input features and tuning variables. Similar to LiR, the tuning variable(s) of the cost function are optimized (typically by taking the log of some variation of the cost function) such that the result of the cost function, given variable representations of the input features, is a number between 0 and 1, preferably falling on either side of 0.5. As described in LiR, gradient descent may also be used in LoR cost function optimization and is an example of the process. In example embodiments, user transporting histories are used as the independent variables to train a LoR machine learning module, which, after training, is used to estimate, for example, whether fraud is likely.

Bayesian Network

In one example embodiment, a Bayesian Network is implemented. BNs are used in machine learning to make predictions through Bayesian inference from probabilistic graphical models. In BNs, input features are mapped onto a directed acyclic graph forming the nodes of the graph. The edges connecting the nodes contain the conditional dependencies between nodes to form a predicative model. For each connected node, the probability of the input features resulting in the connected node is learned and forms the predictive mechanism. The nodes may comprise the same, similar or different probability functions to determine movement from one node to another. The nodes of a Bayesian network are conditionally independent of its non-descendants given its parents thus satisfying a local Markov property. This property affords reduced computations in larger networks by simplifying the joint distribution.

There are multiple methods to evaluate the inference, or predictability, in a BN but only two are mentioned for demonstrative purposes. The first method involves computing the joint probability of a particular assignment of values for each variable. The joint probability can be considered the product of each conditional probability and, in some instances, comprises the logarithm of that product. The second method is Markov chain Monte Carlo (MCMC), which can be implemented when the sample size is large. MCMC is a well-known class of sample distribution algorithms and will not be discussed in detail herein. The assumption of conditional independence of variables forms the basis for Naive Bayes classifiers. This assumption implies there is no correlation between different input features. As a result, the number of computed probabilities is significantly reduced as well as the computation of the probability normalization. While independence between features is rarely true, this assumption exchanges reduced computations for less accurate predictions, however the predictions are reasonably accurate. In example embodiments, user transporting histories are mapped to the BN graph to train the BN machine learning module, which, after training, is used to estimate whether fraud is likely.

Random Forest

In one example embodiment, random forest ("RF") is implemented. RF consists of an ensemble of decision trees producing individual class predictions. The prevailing prediction from the ensemble of decision trees becomes the RF prediction. Decision trees are branching flowchart-like graphs comprising of the root, nodes, edges/branches, and leaves. The root is the first decision node from which feature information is assessed and from it extends the first set of edges/branches. The edges/branches contain the information of the outcome of a node and pass the information to the next node. The leaf nodes are the terminal nodes that output the prediction. Decision trees can be used for both classification as well as regression and is typically trained using supervised learning methods. Training of a decision tree is sensitive to the training data set. An individual decision tree may become over or under-fit to the training data and result in a poor predictive model. Random forest compensates by using multiple decision trees trained on different data sets. In example embodiments, user transporting histories are used to train the nodes of the decision trees of a RF machine learning module, which, after training, is used to estimate whether fraud is likely.

Gradient Boosting

In an example embodiment, gradient boosting is implemented. Gradient boosting is a method of strengthening the evaluation capability of a decision tree node. In general, a tree is fit on a modified version of an original data set. For example, a decision tree is first trained with equal weights across its nodes. The decision tree is allowed to evaluate data to identify nodes that are less accurate. Another tree is added to the model and the weights of the corresponding under-performing nodes are then modified in the new tree to improve their accuracy. This process is performed iteratively until the accuracy of the model has reached a defined threshold or a defined limit of trees has been reached. Less accurate nodes are identified by the gradient of a loss function. Loss functions must be differentiable such as a linear or logarithmic functions. The modified node weights in the new tree are selected to minimize the gradient of the loss function. In an example embodiment, a decision tree is implemented to determine user transporting histories and gradient boosting is applied to the tree to improve its ability to accurately determine whether fraud is likely.

Neural Networks

In one example embodiment, Neural Networks are implemented. NNs are a family of statistical learning models influenced by biological neural networks of the brain. NNs can be trained on a relatively-large dataset (e.g., 50,000 or more) and used to estimate, approximate, or predict an output that depends on a large number of inputs/features. NNs can be envisioned as so-called "neuromorphic" systems of interconnected processor elements, or "neurons", and exchange electronic signals, or "messages". Similar to the so-called "plasticity" of synaptic neurotransmitter connections that carry messages between biological neurons, the connections in NNs that carry electronic "messages" between "neurons" are provided with numeric weights that correspond to the strength or weakness of a given connection. The weights can be tuned based on experience, making NNs adaptive to inputs and capable of learning. For example, an NN for user transporting histories is defined by a set of input neurons that can be given input data such as user transporting histories. The input neuron weighs and transforms the input data and passes the result to other neurons, often referred to as "hidden" neurons. This is repeated until an output neuron is activated. The activated output neuron produces a result. In example embodiments, user interaction histories and secondary user actions or data are used to train the neurons in a NN machine learning module, which, after training, is used to estimate whether fraud is likely.

Convolutional Autoencoder

In example embodiments, convolutional autoencoder (CAE) is implemented. A CAE is a type of neural network and comprises, in general, two main components. First, the convolutional operator that filters an input signal to extract features of the signal. Second, an autoencoder that learns a set of signals from an input and reconstructs the signal into an output. By combining these two components, the CAE learns the optimal filters that minimize reconstruction error resulting an improved output. CAEs are trained to only learn filters capable of feature extraction that can be used to reconstruct the input. Generally, convolutional autoencoders implement unsupervised learning. In example embodiments, the convolutional autoencoder is a variational convolutional autoencoder. In example embodiments, features from a user transporting histories are used as an input signal into a CAE which reconstructs that signal into an output such as a whether fraud is likely.

Deep Learning

In example embodiments, deep learning is implemented. Deep learning expands the neural network by including more layers of neurons. A deep learning module is characterized as having three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction. In example embodiments, user transporting histories are used to train the neurons of a deep learning module, which, after training, is used to estimate whether fraud is likely.

Convolutional Neural Network (CNN)

In an example embodiment, a convolutional neural network is implemented. CNNs is a class of NNs further attempting to replicate the biological neural networks, but of the animal visual cortex. CNNs process data with a grid pattern to learn spatial hierarchies of features. Wherein NNs are highly connected, sometimes fully connected, CNNs are connected such that neurons corresponding to neighboring data (e.g., pixels) are connected. This significantly reduces the number of weights and calculations each neuron must perform.

In general, input data, such as user transporting histories, comprises a multidimensional vector. A CNN, typically, comprises of three layers: convolution, pooling, and fully connected. The convolution and pooling layers extract features and the fully connected layer combines the extracted features into an output, such as whether fraud is likely.

In particular, the convolutional layer comprises of multiple mathematical operations such as of linear operations, a specialized type being a convolution. The convolutional layer calculates the scalar product between the weights and the region connected to the input volume of the neurons. These computations are performed on kernels, which are reduced dimensions of the input vector. The kernels span the entirety of the input. The rectified linear unit (i.e., ReLu) applies an elementwise activation function (e.g., sigmoid function) on the kernels.

CNNs can be optimized with hyperparameters. In general, there three hyperparameters are used: depth, stride, and zero-padding. Depth controls the number of neurons within a layer. Reducing the depth may increase the speed of the CNN but may also reduce the accuracy of the CNN. Stride determines the overlap of the neurons. Zero-padding controls the border padding in the input.

The pooling layer down-samples along the spatial dimensionality of the given input (i.e., convolutional layer output), reducing the number of parameters within that activation. As an example, kernels are reduced to dimensionalities of 2×2 with a stride of 2, which scales the activation map down to 25%. The fully connected layer uses inter-layer-connected neurons (i.e., neurons are only connected to neurons in other layers) to score the activations for classification and/or regression. Extracted features may become hierarchically more complex as one layer feeds its output into the next layer. See O'Shea, K.; Nash, R. An Introduction to Convolutional Neural Networks. arXiv 2015 and Yamashita, R., et al Convolutional neural networks: an overview and application in radiology. Insights Imaging 9, 611-629 (2018).

Recurrent Neural Network (RNN)

In an example embodiment, a recurrent neural network is implemented. RNNs are class of NNs further attempting to replicate the biological neural networks of the brain. RNNs comprise of delay differential equations on sequential data or time series data to replicate the processes and interactions of the human brain. RNNs have "memory" wherein the RNN can take information from prior inputs to influence the current output. RNNs can process variable length sequences of inputs by using their "memory" or internal state information. Where NNs may assume inputs are independent from the outputs, the outputs of RNNs may be dependent on prior elements with the input sequence. For example, input such as is received by a RNN, which determines whether one or more rules would be useful to identify a likely failure. See Sherstinsky, Alex. "Fundamentals of recurrent neural network (RNN) and long short-term memory (LSTM) network." Physica D: Nonlinear Phenomena 404 (2020): 132306.

Long Short-term Memory (LSTM)

In an example embodiment, a Long Short-term Memory is implemented. LSTM are a class of RNNs designed to overcome vanishing and exploding gradients. In RNNs, long term dependencies become more difficult to capture because the parameters or weights either do not change with training or fluctuate rapidly. This occurs when the RNN gradient exponentially decreases to zero, resulting in no change to the weights or parameters, or exponentially increases to infinity, resulting in large changes in the weights or parameters. This exponential effect is dependent on the number of layers and multiplicative gradient. LSTM overcomes the vanishing/exploding gradients by implementing "cells" within the hidden layers of the NN. The "cells" comprise three gates: an input gate, an output gate, and a forget gate. The input gate reduces error by controlling relevant inputs to update the current cell state. The output gate reduces error by controlling relevant memory content in the present hidden state. The forget gate reduces error by controlling whether prior cell states are put in "memory" or forgotten. The gates use activation functions to determine whether the data can pass through the gates. While one skilled in the art would recognize the use of any relevant activation function, example activation functions are sigmoid, tanh, and RELU. See Zhu, Xiaodan, et al. "Long short-term memory over recursive structures." International Conference on Machine Learning. PMLR, 2015.

Matrix Factorization

In example embodiments, Matrix Factorization is implemented. Matrix factorization machine learning exploits inherent relationships between two entities drawn out when multiplied together. Generally, the input features are mapped to a matrix F which is multiplied with a matrix R containing the relationship between the features and a predicted outcome. The resulting dot product provides the prediction. The matrix R is constructed by assigning random values throughout the matrix. In this example, two training matrices are assembled. The first matrix X contains training input features and the second matrix Z contains the known output of the training input features. First the dot product of R and X are computed and the square mean error, as one example method, of the result is estimated. The values in R are modulated and the process is repeated in a gradient descent style approach until the error is appropriately minimized. The trained matrix R is then used in the machine learning model. In example embodiments, user transporting histories are used to train the relationship matrix R in a matrix factorization machine learning module. After training, the relationship matrix R and input matrix F, which comprises vector representations of user transporting histories, results in the prediction matrix P comprising whether fraud is likely.

Hidden Markov Model

In example embodiments, a hidden Markov model is implemented. An HMM takes advantage of the statistical Markov model to predict an outcome. A Markov model assumes a Markov process, wherein the probability of an outcome is solely dependent on the previous event. In the case of HMM, it is assumed an unknown or "hidden" state is dependent on some observable event. An HMM comprises a network of connected nodes. Traversing the network is dependent on three model parameters: start probability; state transition probabilities; and observation probability. The start probability is a variable that governs, from the input node, the most plausible consecutive state. From there each node i has a state transition probability to node j. Typically the state transition probabilities are stored in a matrix $M_{ij}$ wherein the sum of the rows, representing the probability of state i transitioning to state j, equals 1. The observation probability is a variable containing the probability of output o occurring. These too are typically stored in a matrix $N_{oj}$ wherein the probability of output o is dependent on state j. To build the model parameters and train the HMM, the state and output probabilities are computed. This can be accomplished with, for example, an inductive algorithm. Next, the state sequences are ranked on probability, which can be accomplished, for example, with the Viterbi algorithm. Finally, the model parameters are modulated to maximize the probability of a certain sequence of observations. This is typically accomplished with an iterative process wherein the neighborhood of states is explored, the probabilities of the state sequences are measured, and model parameters updated to increase the probabilities of the state sequences. In example embodiments, user transporting histories are used to train the nodes/states of the HMM machine learning module, which, after training, is used to estimate whether one or more rules would be useful to identify a likely failure.

Support Vector Machine

In example embodiments, support vector machines are implemented. SVMs separate data into classes defined by n-dimensional hyperplanes (n-hyperplane) and are used in both regression and classification problems. Hyperplanes are decision boundaries developed during the training process of an SVM. The dimensionality of a hyperplane depends on the number of input features. For example, a SVM with two input features will have a linear (I-dimensional) hyperplane while a SVM with three input features will have a planer (2-dimensional) hyperplane. A hyperplane is optimized to have the largest margin or spatial distance from the nearest data point for each data type. In the case of simple linear regression and classification a linear equation is used to develop the hyperplane. However, when the features are more complex a kernel is used to describe the hyperplane. A kernel is a function that transforms the input features into higher dimensional space. Kernel functions can be linear, polynomial, a radial distribution function (or gaussian radial distribution function), or sigmoidal. In example embodiments, user transporting histories are used to train the linear equation or kernel function of the SVM machine learning module, which, after training, is used to estimate whether one or more rules would be useful to identify a likely failure.

K-Means Clustering

In one example embodiment, K-means clustering is implemented. KMC assumes data points have implicit shared characteristics and "clusters" data within a centroid or "mean" of the clustered data points. During training, KMC adds a number of k centroids and optimizes its position around clusters. This process is iterative, where each centroid, initially positioned at random, is re-positioned towards the average point of a cluster. This process concludes when the centroids have reached an optimal position within a cluster. Training of a KMC module is typically unsupervised. In example embodiments, user transporting histories are used to train the centroids of a KMC machine learning module, which, after training, is used to estimate whether fraud is likely.

K-Nearest Neighbor

In one example embodiment, K-nearest neighbor is implemented. On a general level, KNN shares similar characteristics to KMC. For example, KNN assumes data points near each other share similar characteristics and computes the distance between data points to identify those similar characteristics but instead of k centroids, KNN uses k number of neighbors. The kin KNN represents how many neighbors will assign a data point to a class, for classification, or object property value, for regression. Selection of an appropriate number of k is integral to the accuracy of KNN. For example, a large k may reduce random error associated with variance in the data but increase error by ignoring small but significant differences in the data. Therefore, a careful choice of k is selected to balance overfitting and underfitting. Concluding whether some data point belongs to some class or property value k, the distance between neighbors is computed. Common methods to compute this distance are Euclidean, Manhattan or Hamming to name a few. In some embodiments, neighbors are given weights depending on the neighbor distance to scale the similarity between neighbors to reduce the error of edge neighbors of one class "outvoting" near neighbors of another class. In one example embodiment, k is I and a Markov model approach is utilized. In example embodiments, user transporting histories are used to train a KNN machine learning module, which, after training, is used to estimate a failure is likely.

To perform one or more of its functionalities, the machine learning module may communicate with one or more other systems. For example, an integration system may integrate the machine learning module with one or more email servers, web servers, one or more databases, or other servers, systems, or repositories. In addition, one or more functionalities may require communication between a user and the machine learning module.

Any one or more of the modules described herein may be implemented using hardware (e.g., one or more processors of a computer/machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, to allow information to be passed between the applications so as to allow the applications to share and access common data.

Multimodal Translation

In an example embodiment, the machine learning module comprises multimodal translation (MT), also known as multimodal machine translation or multimodal neural machine translation. MT comprises of a machine learning module capable of receiving multiple (e.g. two or more) modalities. Typically, the multiple modalities comprise of information connected to each other.

In example embodiments, the MT may comprise of a machine learning method further described herein. In an example embodiment, the MT comprises a neural network, deep neural network, convolutional neural network, convolutional autoencoder, recurrent neural network, or an LSTM.

For example, one or more microscopy imaging data comprising multiple modalities from a subject is embedded as further described herein. The embedded data is then received by the machine learning module. The machine learning module processes the embedded data (e.g. encoding and decoding) through the multiple layers of architecture then determines the corresponding the modalities comprising the input. The machine learning methods further described herein may be engineered for MT wherein the inputs described herein comprise of multiple modalities. See e.g. Sulubacak, U., Caglayan, O., Gronroos, S A et al. Multimodal machine translation through visuals and speech. Machine Translation 34, 97-147 (2020) and Huang, Xun, et al. "Multimodal unsupervised image-to-image translation." Proceedings of the European conference on computer vision (ECCV). 2018.

The ladder diagrams, scenarios, flowcharts and block diagrams in the figures and discussed herein illustrate architecture, functionality, and operation of example embodiments and various aspects of systems, methods, and computer program products of the present invention. Each block in the flowchart or block diagrams can represent the processing of information and/or transmission of information corresponding to circuitry that can be configured to execute the logical functions of the present techniques. Each block in the flowchart or block diagrams can represent a module, segment, or portion of one or more executable instructions for implementing the specified operation or step. In example embodiments, the functions/acts in a block can occur out of the order shown in the figures and nothing requires that the operations be performed in the order illustrated. For example, two blocks shown in succession can executed concurrently or essentially concurrently. In another example, blocks can be executed in the reverse order. Furthermore, variations, modifications, substitutions, additions, or reduction in blocks and/or functions may be used with any of the ladder diagrams, scenarios, flow charts and block diagrams discussed herein, all of which are explicitly contemplated herein.

The ladder diagrams, scenarios, flow charts and block diagrams may be combined with one another, in part or in whole. Coordination will depend upon the required functionality. Each block of the block diagrams and/or flowchart illustration as well as combinations of blocks in the block diagrams and/or flowchart illustrations can be implemented by special purpose hardware-based systems that perform the aforementioned functions/acts or carry out combinations of special purpose hardware and computer instructions. Moreover, a block may represent one or more information transmissions and may correspond to information transmissions among software and/or hardware modules in the same physical device and/or hardware modules in different physical devices.

The present techniques can be implemented as a system, a method, a computer program product, digital electronic circuitry, and/or in computer hardware, firmware, software, or in combinations of them. The system may comprise distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors.

FIG. 3 depicts a block diagram of a computing machine 2000 and a module 2050 in accordance with certain examples. The computing machine 2000 may comprise, but is not limited to, remote devices, work stations, servers, computers, general purpose computers, Internet/web appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and any machine capable of executing the instructions. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The one or more embodiments of processor 2010 may be configured to execute code or instructions to perform the operations and functionality described herein, manage request flow and address mappings, and to perform calculations and generate commands. Such code or instructions could include, but is not limited to, firmware, resident software, microcode, and the like. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), tensor processing units (TPUs), a graphics processing unit ("GPU"), a field programmable gate array ("FPGA"), a programmable logic device ("PLD"), a radio-frequency integrated circuit (RFIC), a controller, a state machine, gated logic, discrete hardware components, any other processing unit, or any combination or multiplicity thereof. In example embodiments, each processor 2010 can include a reduced instruction set computer (RISC) microprocessor. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines. Processors 2010 are coupled to system memory and various other components via a system bus 2020.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random-access memory ("RAM"), static random-access memory ("SRAM"), dynamic random-access memory ("DRAM"), and synchronous dynamic random-access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 is coupled to system bus 2020 and can include a basic input/output system (BIOS), which controls certain basic functions of the processor 2010 and/or operate in conjunction with, a non-volatile storage device such as the storage media 2040.

In example embodiments, the computing device 2000 includes a graphics processing unit (GPU) (not shown). Graphics processing unit is a specialized electronic circuit designed to manipulate and alter memory to accelerate the creation of images in a frame buffer intended for output to a display. In general, a graphics processing unit is efficient at manipulating computer graphics and image processing and has a highly parallel structure that makes it more effective than general-purpose CPUs for algorithms where processing of large blocks of data is done in parallel.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any electromagnetic storage device, any semiconductor storage device, any physical-based storage device, any removable and non-removable media, any other data storage device, or any combination or multiplicity thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The module 2050 may comprise one or more hardware or software elements, as well as an operating system, configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. Each of the operating system, one or more application programs, other program modules, and program data or some combination thereof, may include an implementation of a networking environment. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for coupling in operation the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including cursor control devices, touch-screens, scanners, electronic digitizers, sensors, receivers, touchpads, trackballs, cameras, microphones, alphanumeric input devices, any other pointing devices, or any combinations thereof. The I/O interface 2060 may couple the computing machine 2000 to various output devices including video displays (The computing device 2000 may further include a graphics display, for example, a plasma display panel (PDP), a light emitting diode (LED) display, a liquid crystal display (LCD), a projector, a cathode ray tube (CRT), or any other display capable of displaying graphics or video), audio generation device, printers, projectors, tactile feedback devices, automation control, robotic components, actuators, motors, fans, solenoids, valves, pumps, transmitters, signal emitters, lights, and so forth. The I/O interface 2060 may couple the computing device 2000 to various devices capable of input and out, such as a storage unit. The devices can be interconnected to the system bus 2020 via a user interface adapter, which can include, for example, a Super I/O chip integrating multiple device adapters into a single integrated circuit.

The computing machine 2000 may operate in a networked environment using logical connections through the network interface 2070 to one or more other systems or computing machines across the network 2080. The network 2080 may include a local area network ("LAN"), a wide area network ("WAN"), an intranet, an Internet, a mobile telephone network, storage area network ("SAN"), personal area network ("PAN"), a metropolitan area network ("MAN"), a wireless network ("WiFi;"), wireless access networks, a wireless local area network ("WLAN"), a virtual private network ("VPN"), a cellular or other mobile communication network, Bluetooth, near field communication ("NFC"), ultra-wideband, wired networks, telephone networks, optical networks, copper transmission cables, or combinations thereof or any other appropriate architecture or system that facilitates the communication of signals and data. The network 2080 may be packet switched, circuit switched, of any topology, and may use any communication protocol. The network 2080 may comprise routers, firewalls, switches, gateway computers and/or edge servers. Communication links within the network 2080 may involve various digital or analog communication media such as fiber optic cables, free-space optics, waveguides, electrical conductors, wireless links, antennas, radio-frequency communications, and so forth.

Information for facilitating reliable communications can be provided, for example, as packet/message sequencing information, encapsulation headers and/or footers, size/time information, and transmission verification information such as cyclic redundancy check (CRC) and/or parity check values. Communications can be made encoded/encrypted, or otherwise made secure, and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure and then decrypt/decode communications.

The processor 2010 may be connected to the other elements of the computing machine 2000 or the various peripherals discussed herein through the system bus 2020. The system bus 2020 represents one or more of any of several types of bus structures, including a memory bus or memory controller, a peripheral bus, an accelerated graphics port, and a processor or local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those ordinarily skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

A "server" may comprise a physical data processing system (for example, the computing device 2000 as shown in FIG. 3) running a server program. A physical server may or may not include a display and keyboard. A physical server may be connected, for example by a network, to other computing devices. Servers connected via a network may operate in the capacity of a server machine or a client machine in a server-client network environment, or as a peer machine in a distributed (e.g., peer-to-peer) network environment. The computing device 2000 can include clients' servers. For example, a client and server can be remote from each other and interact through a network. The relationship of client and server arises by virtue of computer programs in communication with each other, running on the respective computers.

The example systems, methods, and acts described in the examples and described in the figures presented previously are illustrative, not intended to be exhaustive, and not meant to be limiting. In alternative examples, certain acts can be performed in a different order, in parallel with one another, omitted entirely, and/or combined between different examples, and/or certain additional acts can be performed, without departing from the scope and spirit of various examples. Plural instances may implement components, operations, or structures described as a single instance. Structures and functionality that may appear as separate in example embodiments may be implemented as a combined structure or component. Similarly, structures and functionality that may appear as a single component may be implemented as separate components. Accordingly, such alternative examples are included in the scope of the following claims, which are to be accorded the broadest interpretation to encompass such alternate examples. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data encryption system, comprising:
one or more processors communicatively coupled to a storage device, wherein the one or more processors execute instructions that are stored in the storage device to cause the data encryption system to:
receive, from an application associated with a provider system, a request for a single-use delivery token, the request comprising an address and an identifier of a distribution system of a plurality of distribution systems, wherein the single-use delivery token expires after a single use;
determine, based on the identifier, a distributor key of a plurality of distributor keys, wherein each distributor key of the plurality of distributor keys decrypts corresponding delivery tokens for each of the plurality of distribution systems;
identify an encryption key of a plurality of encryption keys, the encryption key corresponding to the distributor key, wherein each encryption key of the plurality of encryption keys encrypts delivery tokens for a corresponding distribution system;
generate, using the encryption key, the single-use delivery token comprising the address; and
transmit the single-use delivery token to the application associated with the provider system.

2. The data encryption system of claim 1, further comprising instructions to:
input, into a machine learning model, a plurality of requests from the application, the plurality of requests comprising a new request, to cause the machine learning model to predict whether the new request is valid, wherein the machine learning model is trained to predict validity of requests;
receive, from the machine learning model, a prediction indicating that the new request is invalid; and
in response to receiving the prediction indicating that the request is invalid, reject the new request.

3. The data encryption system of claim 2, wherein the machine learning model is trained to predict the validity of the requests based on addresses associated with the requests, and wherein the prediction is based on a determination that a new address associated with the new request is located within a predetermined area.

4. The data encryption system of claim 2, wherein the machine learning model is trained to predict the validity of the requests based on patterns within the plurality of requests, and wherein the prediction is based on a determination that a new address associated with the new request matches one or more addresses associated with one or more other requests of the plurality of requests.

5. The data encryption system of claim 1, further comprising instructions to:
retrieve a listing of the plurality of distribution systems, wherein each distribution system within the listing comprises a corresponding identifier;
compare the identifier received with the request with the listing; and
identify the distribution system of the plurality of distribution systems based on the identifier matching the corresponding identifier of the distribution system in the listing.

6. The data encryption system of claim 1, wherein the instructions to generate, using the encryption key, the single-use delivery token further cause the data encryption system to:
generate a data structure comprising one or more fields;
modify a first field of the one or more fields to include the address to generate a modified data structure;
perform a lookup, within a database, for an encryption function;
input, into the encryption function, the encryption key and the modified data structure; and
receive, from the encryption function, the single-use delivery token.

7. The data encryption system of claim 1, further comprising instructions to:
receive, from the distribution system, tracking data corresponding to the request;
determine, for a user associated with the request, a user key of a plurality of user keys, wherein the plurality of user keys decrypts tracking tokens for a plurality of users;
identify a new encryption key of the plurality of encryption keys, the new encryption key corresponding to the user key;
generate, using the new encryption key, a tracking token comprising the tracking data; and
transmit, to the application associated with the provider system, the tracking token.

8. The data encryption system of claim 1, wherein the instructions to identify the distributor key further cause the data encryption system to:
request the distributor key from the distribution system;
receive the distributor key from the distribution system;
perform a lookup, within a database, for the distributor key based on the identifier;
determine that the distributor key received from the distribution system matches the distributor key in the database; and
based on determining that the distributor key received from the distribution system matches the distributor key in the database, authorize the distributor key.

9. A method comprising:
receiving, from an application associated with a provider system, a request for a delivery token, the request comprising an address and an identifier of a distribution system of a plurality of distribution systems;
determining, based on the identifier, a distributor key of a plurality of distributor keys, wherein each distributor key of the plurality of distributor keys decrypts corresponding delivery tokens for each of the plurality of distribution systems;
identifying an encryption key of a plurality of encryption keys, the encryption key corresponding to the distributor key, wherein each encryption key of the plurality of encryption keys encrypts delivery tokens for a corresponding distribution system;
generating, using the encryption key, the delivery token comprising the address; and
transmitting the delivery token to the application associated with the provider system.

10. The method of claim 9, further comprising:
inputting, into a machine learning model, a plurality of requests from the application, the plurality of requests comprising a new request, to cause the machine learning model to predict whether the new request is valid, wherein the machine learning model is trained to predict validity of requests;
receiving, from the machine learning model, a prediction indicating that the new request is invalid; and
in response to receiving the prediction indicating that the request is invalid, rejecting the new request.

11. The method of claim 10, wherein the machine learning model is trained to predict the validity of the requests based on addresses associated with the requests, and wherein the prediction is based on a determination that a new address associated with the new request is located within a predetermined area.

12. The method of claim 10, wherein the machine learning model is trained to predict the validity of the requests based on patterns within the plurality of requests, and wherein the prediction is based on a determination that a new address associated with the new request matches one or more addresses associated with one or more other requests of the plurality of requests.

13. The method of claim 9, further comprising:
retrieve a listing of the plurality of distribution systems, wherein each distribution system within the listing comprises a corresponding identifier;
compare the identifier received with the request with the listing; and
identify the distribution system of the plurality of distribution systems based on the identifier matching the corresponding identifier of the distribution system in the listing.

14. The method of claim 9, wherein generating, using the encryption key, the delivery token further comprises:
generating a data structure comprising one or more fields;
modifying a first field of the one or more fields to include the address to generate a modified data structure;
performing a lookup, within a database, for an encryption function;
inputting, into the encryption function, the encryption key and the modified data structure; and
receiving, from the encryption function, the delivery token.

15. The method of claim 9, further comprising:
receiving, from the distribution system, tracking data corresponding to the request;
determining, for a user associated with the request, a user key of a plurality of user keys, wherein the plurality of user keys decrypts tracking tokens for a plurality of users;
identifying a new encryption key of the plurality of encryption keys, the new encryption key corresponding to the user key;
generating, using the new encryption key, a tracking token comprising the tracking data; and
transmitting, to the application associated with the provider system, the tracking token.

16. The method of claim 9, wherein identifying the distributor key further comprises:
requesting the distributor key from the distribution system;
receiving the distributor key from the distribution system;
performing a lookup, within a database, for the distributor key based on the identifier;
determining that the distributor key received from the distribution system matches the distributor key in the database; and
based on determining that the distributor key received from the distribution system matches the distributor key in the database, authorizing the distributor key.

17. One or more non-transitory, computer-readable media storing instructions that, when executed by one or more processors, cause operations comprising:
receiving, from an application associated with a provider system, a request for a delivery token, the request comprising an address and an identifier of a distribution system of a plurality of distribution systems;
determining, based on the identifier, a distributor key of a plurality of distributor keys, wherein the distributor key decodes delivery tokens for the distribution system;
identifying an encoding key of a plurality of encoding keys for encoding delivery tokens, the encoding key corresponding to the distributor key;
generating, using the encoding key, the delivery token comprising the address; and
transmitting the delivery token to the application associated with the provider system.

18. The one or more non-transitory, computer-readable media of claim 17, further comprising:
inputting, into a machine learning model, a plurality of requests from the application, the plurality of requests comprising a new request, to cause the machine learning model to predict whether the new request is valid, wherein the machine learning model is trained to predict validity of requests;
receiving, from the machine learning model, a prediction indicating that the new request is invalid; and
in response to receiving the prediction indicating that the request is invalid, rejecting the new request.

19. The one or more non-transitory, computer-readable media of claim 18, wherein the machine learning model is trained to predict the validity of the requests based on addresses associated with the requests, and wherein the prediction is based on a determination that a new address associated with the new request is located within a predetermined area.

20. The one or more non-transitory, computer-readable media of claim 18, wherein the machine learning model is trained to predict the validity of the requests based on patterns within the plurality of requests, and wherein the prediction is based on a determination that a new address associated with the new request matches one or more addresses associated with one or more other requests of the plurality of requests.

* * * * *